(12) United States Patent
Hansen et al.

(10) Patent No.: US 8,202,638 B2
(45) Date of Patent: Jun. 19, 2012

(54) FUEL PROCESSING METHOD AND SYSTEM

(75) Inventors: John Bøgild Hansen, Copenhagen Ø (DK); Søren Dahl, Hillerød (DK)

(73) Assignee: Haldor Topsoe A/S, Lyngby (DK)

( * ) Notice: Subject to any disclaimer, the term of this patent is extended or adjusted under 35 U.S.C. 154(b) by 1352 days.

(21) Appl. No.: 11/235,097

(22) Filed: Sep. 27, 2005

(65) Prior Publication Data
US 2007/0072017 A1 Mar. 29, 2007

(51) Int. Cl.
*H01M 8/10* (2006.01)
*H01M 8/12* (2006.01)

(52) U.S. Cl. ......... 429/34; 429/408; 429/416; 429/424; 429/465; 429/488; 429/495

(58) Field of Classification Search ............. None
See application file for complete search history.

(56) References Cited

U.S. PATENT DOCUMENTS

| | | | |
|---|---|---|---|
| 4,298,694 A | 11/1981 | Skov et al. | |
| 5,595,833 A | 1/1997 | Gardner et al. | |
| 5,993,984 A * | 11/1999 | Matsumura et al. | 429/424 |
| 7,285,350 B2 * | 10/2007 | Keefer et al. | 429/34 |
| 2004/0137288 A1 * | 7/2004 | Morgenstern | 429/17 |
| 2005/0226792 A1 * | 10/2005 | Jahnke et al. | 422/188 |

FOREIGN PATENT DOCUMENTS

| | | |
|---|---|---|
| DE | 101 43 656 A1 | 5/2003 |
| EP | 1 557 897 | 7/2005 |
| WO | WO 03/063276 | 7/2003 |
| WO | WO 2004/021496 A1 | 3/2004 |

* cited by examiner

*Primary Examiner* — Ula C. Ruddock
*Assistant Examiner* — Alix Echelmeyer
(74) *Attorney, Agent, or Firm* — Dickstein Shapiro LLP

(57) ABSTRACT

A fuel processing method for a solid oxide fuel cell stack comprising the steps of:
(a) supplying a feed stream comprising ethanol to a methanation reactor containing catalytic material for the methanation of ethanol;
(b) processing the feed stream in the methanation reactor under adiabatic conditions to produce an effluent fuel comprising methane;
(c) transferring the effluent fuel comprising methane to the anode of a solid oxide fuel cell stack comprising at least one solid oxide fuel cell;
(d) providing the cathode of the solid oxide fuel cell stack with an oxygen-containing gas; and
(e) converting the fuel comprising methane and the oxygen-containing gas to electricity in the solid oxide fuel cell stack.

9 Claims, 3 Drawing Sheets

FUEL PROCESSING METHOD AND SYSTEM

BACKGROUND OF THE INVENTION

Ethanol could be an attractive fuel for use in SOFC combined heat and power plants, for instance those plants intended for use as auxiliary power units for trucks and marine applications. Potentially the fuel processing steps in such a plant could be very simple ultimately being only evaporation of the ethanol and injection into the anode chamber of the SOFC.

This approach would, however, lead to a number of problems and disadvantages:

Saunders, G. J. et al. (Formulating liquid hydrocarbon fuels for SOFCs, Pages 23-26, from Journal of Power Sources Volume 131, Issues 1-2, Pages 1-367 (14 May 2004)) show that dry ethanol is very prone to form carbon at conditions prevailing in the anode chamber of the SOFC with the most active Ni-cremates as anode material, resulting in deactivation of the SOFC after a few hours of operation. It is well known that it is very difficult to avoid carbon formation from ethanol on Ni containing catalyst under steam reforming conditions where ethanol is reacted with steam. The reason for this being dehydration of ethanol to ethylene which then polymerises. The problem of coking involved with ethanol reforming catalysts is described, for example, by Haga et al. in Nippon Kagaku Kaishi, 33-6 (1997) and Freni et al. in React. Kinet. Catal. Lett. 71, p. 143-52 (2000). Thus, reforming of the ethanol in the anode chamber by adding water (internal reforming) is not a simple way to alleviate the problem with carbon formation.

Carbon formation on steam reforming catalysts and in a SOFC plant can also take place by the following reversible reactions:

$$CH_4 \leftrightarrow C + 2H_2 \quad (-\Delta H_{298} = -74.9 \text{ kJ/mol}) \quad [1]$$

$$2CO \leftrightarrow C + CO_2 \quad (-\Delta H_{298} = 172.4 \text{ kJ/mol}) \quad [2]$$

Reaction [2] is known as the Boudouard reaction. Ethanol can decompose to CO according to reaction [3]

$$CH_3CH_2OH \leftrightarrow CO + H_2 + CH_4 \quad (-\Delta H_{298} = -51.3 \text{ kJ/mol}) \quad [3]$$

As CO is quite reactive, it is important to know the temperature and gas composition ranges, where reaction [2] does not occur. This can be studied using "the principle of the equilibrated gas" assuming both methanation/steam reforming (reaction [4]) and the shift reaction (reaction [5]) to be in equilibrium, as further described by Nielsen, J. R. (Catalytic Steam Reforming, Springer Verlag, Berlin 1984).

$$CH_4 + 2H_2O \leftrightarrow CO_2 + 4H_2 \quad (-\Delta H_{298} = -165.0 \text{ kJ/mol}) \quad [4]$$

$$CO + H_2O \leftrightarrow CO_2 + H_2 \quad (-\Delta H_{298} = 41.2 \text{ kJ/mol}) \quad [5]$$

Sasaki, K. and Teraoka, Y. (Equilibria in Fuel Cell Gases Pages 1225-1239 from Solid Oxide Fuel Cells VIII (SOFC VIII) Proceedings Volume 2003-07) have studied the amount of water needed to avoid carbon formation.

A further disadvantage of using ethanol as direct fuel in an SOFC compared to using methane is related to the heat of reactions when steam reforming this fuel. Steam reforming of methane is given in equation 4 and the reforming reactions for ethanol is given in equation 6:

$$CH_4 + 2H_2O \leftrightarrow CO_2 + 4H_2 \quad (-\Delta H_{1023} = -191.4 \text{ kJ/mol}) \quad [4]$$

$$CH_3CH_2OH + 3H_2O \leftrightarrow 2CO_2 + 6H_2 \quad (-\Delta H_{1023} = -209 \text{ kJ/mol}) \quad [6]$$

Reforming of the fuel in the anode chamber (internal reforming) helps to cool the stack due to the endothermal nature of the reforming process. However, the heat of reactions for ethanol reforming are much less endothermic (pr $H_2$ produced) than methane steam reforming, therefore the cooling of the stack provided by steam reforming of ethanol is less effective.

The fuel processing method of the invention describes a process lay-out where all the above problems are overcome by adiabatically converting ethanol into a mixture of methane, $H_2$, CO, $CO_2$ and water.

It is an objective of the invention to provide a fuel processing method for solid oxide fuel cells, whereby the fuel ethanol is adiabatically converted to a mixture of methane, $H_2$, CO, $CO_2$ and water before conversion in a solid oxide fuel cell.

SUMMARY OF THE INVENTION

The invention therefore provides a fuel processing method for a solid oxide fuel cell stack comprising the steps of:
(a) supplying a feed stream comprising ethanol to a methanation reactor containing catalytic material for the methanation of ethanol;
(b) processing the feed stream in the methanation reactor under adiabatic conditions to produce an effluent fuel comprising methane;
(c) transferring the effluent fuel comprising methane to the anode of a solid oxide fuel cell stack comprising at least one solid oxide fuel cell;
(d) providing the cathode of the solid oxide fuel cell stack with an oxygen-containing gas;
(e) converting the fuel comprising methane and the oxygen-containing gas to electricity in the solid oxide fuel cell stack.

The invention also provides a fuel processing system for use in the fuel processing method comprising a methanation reactor comprising catalytic material for methanation of ethanol and a solid oxide fuel cell stack comprising at least one solid oxide fuel cell, the solid oxide fuel cell stack being placed down stream and in series with the methanation reactor.

DETAILED DESCRIPTION OF THE INVENTION

By methanation of ethanol is meant in the following the conversion of ethanol in to a mixture of methane, $H_2$, CO, $CO_2$ and water.

In the fuel processing method of the invention, a fuel comprising ethanol is adiabatically converted into a mixture of methane, hydrogen, carbon monoxide and carbon dioxide and water. In this way part of the chemical energy contained in the ethanol containing feed stream to the methanation reactor is converted to a temperature increase across the methanation reactor. This eliminates the need for the heat exchanger, which is usually required to heat the SOFC fuel to the temperature required at the anode inlet. In addition, ethanol is converted to methane, which is much less prone to carbon lay down than ethylene and carbon monoxide, which could be formed from the feedstock.

The ratio between oxygen and carbon (O/C ratio) in the methanation reactions is very important because this ratio gives an indication of the potential for carbon deposition. Ethanol decomposes via reaction [3] to form carbon monoxide, which in turn can decompose to form carbon via the Boudouard reaction [2]. The O/C ratio for ethanol is 0.5. Generally the O/C ratio has, at a particular temperature, a minimum value above which carbon formation is avoided. In the fuel processing system of the invention, providing the process with extra oxygen increases the O/C ratio. This can be done by transporting oxygen from the cathode air via the fuel cell electrolyte to the anode off gas. The anode off gas is then recycled to the methanation reactor and thereby to the anode inlet. Adding water in substantial amounts to the system can also increase the O/C ratio.

At the same time the chemical energy converted into latent heat in the methanation reactor does not have to be removed by excess cathode air in the SOFC thus increasing overall electric efficiency of the system.

Figure 1:
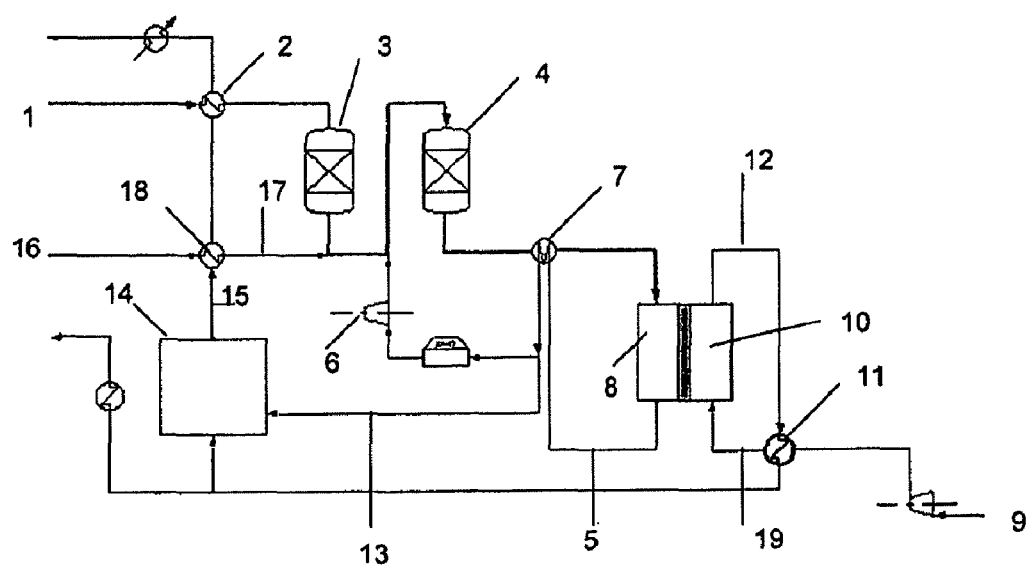
FIG. 1 is a schematic diagram of a conventional fuel processing system based on methane.

FIG. 1 is a schematic diagram of a conventional fuel processing system based on methane. Methane 1 in the form of natural gas is preheated in heat exchanger E1 (identified by reference numeral 2 in FIG. 1) and then desulphurised in a hydrodesulphurization unit 3 by hot zinc oxide at 400° C. followed by performing of the higher hydrocarbons present in the natural gas in a performer 4. This eliminates the risk of formation of unsaturated compounds at elevated temperatures by dehydrogenation of these higher hydrocarbons. These unsaturated compounds (mainly olefins) are prone to form carbon when heated to the required stack inlet temperature. The water (and $CO_2$) needed for prereforming is provided by a partial recycle of the anode off gas 5 by means of a blower 6 with intermediate cooling in heat exchanger E2 (identified by reference numeral 7 in FIG. 1).

The effluent from the prereformer 4 includes methane and is preheated to the inlet temperature of the anode stack by heat exchange with recycle anode off gas 5 in heat exchanger E2 (identified by reference numeral 7 in FIG. 1) and thereafter transferred to the anode 8. Reforming of methane takes place in the anode chamber according to equation 4 and as this reaction is endothermic cooling of the stack occurs.

Air 9 is compressed and transferred to the cathode 10. The stack is kept adiabatic by means of an excess of cathode air 19, which is preheated in heat exchanger E3 (identified by reference numeral 11 in FIG. 1) by heat exchange with cathode off gas 12. The cathode air 19 also provides cooling of the stack.

The off gas 13 from the anode 8, which is not recycled to the prereformer 4 and the off gas 12 from the cathode 10, are finally burnt in a catalytic burner 14. The waste heat in the flue gas 15 from the catalytic burner 14 supplies heat for conversion of water 16 to steam 17 in heat exchanger E6 (identified by reference numeral 18 in FIG. 1) during start-up for natural gas preheating in heat exchanger E1 (identified by reference numeral 2 in FIG. 1) and heat for space heating or other purposes.

All of the components of this lay-out are known for use in fuel processing of natural gas with the exception of the SOFC stack itself and to some degree the hot anode recycle blower.

Replacing natural gas by ethanol in a conventional process layout of this nature would reduce the amount of cooling of the stack obtainable from the endothermic reforming reactions (internal reforming) of ethanol. Further cooling for reducing the temperature of the stack would therefore be required via the cathode air in addition to the amount already being provided. Subsequently, heat exchanger E3 (identified by reference numeral 11 in FIG. 1) would need to be considerably larger. The loss of electrical energy in the air compression step would also increase.

Figure 2:
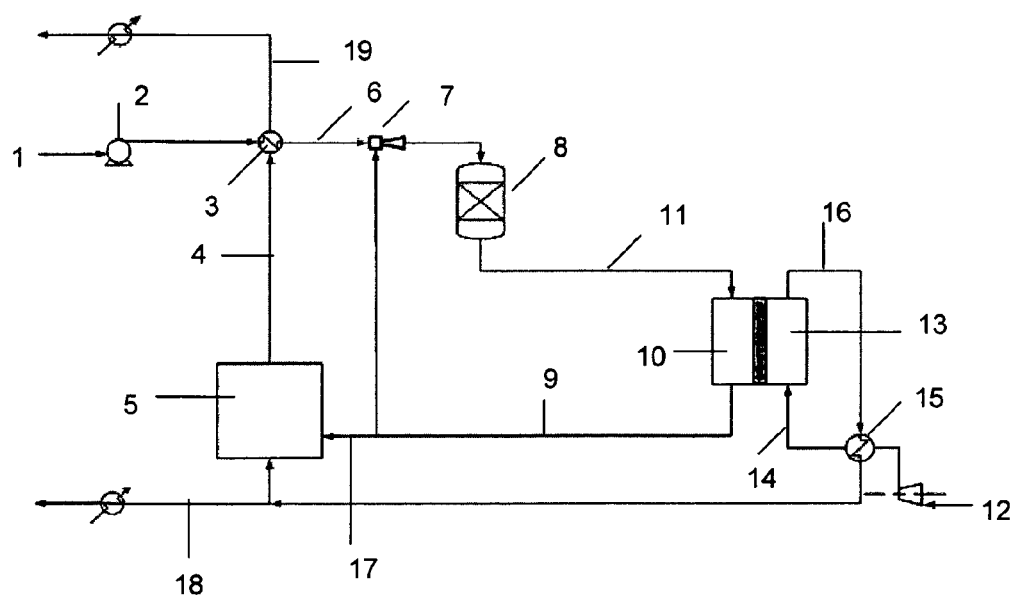
FIG. 2 is a schematic diagram of a fuel processing system based on ethanol.

FIG. 2 is a schematic diagram of a fuel processing system based on ethanol and illustrating an embodiment of the invention. Liquid comprising ethanol 1 is compressed by means of the pump 2 and thereafter evaporated in heat exchanger E1 (identified by reference numeral 3 in FIG.) by means of waste heat in the flue gas 4 from a catalytic burner 5. The gaseous ethanol 6 leaving the heat exchanger E1 (identified by reference numeral 3 in FIG. 2) acts as the motive force in ejector 7, after which it is transferred to a methanation reactor 8. The methanation reactor 8 can have an inlet temperature of for instance 350° C. and an outlet temperature of at least 460° C. Off gas 9 containing $H_2$, $H_2O$, CO, $CO_2$ and $CH_4$ from the solid oxide fuel cell anode 10 is partially recycled to the methanation reactor 8 via the ejector 7. The methanation reactor 8 is loaded with catalyst active for ethanol decomposition and methanation. The methanation reactions for ethanol are as follows:

$$CH_3CH_2OH \Longleftrightarrow CH_4 + CO + H_2 \qquad [3]$$

$$CO + H_2O \Longleftrightarrow CO_2 + H_2 \qquad [5]$$

$$CO + 3H_2 \Longleftrightarrow CH_4 + H_2O \qquad [7]$$

In the methanation reactor 8 ethanol is converted to a mixture of $CH_4$, $H_2$, $H_2O$, CO and $CO_2$ and the effluent 11 from the methanation reactor 8 is transferred to the anode 10 of the SOFC stack. The anode inlet temperature is at least 400° C., preferably at least 500° C.

Air 12 is compressed and transferred to the cathode 13. The stack is kept adiabatic by means of an excess of the compressed cathode air 14, which is preheated in heat exchanger E3 (identified by reference numeral 15 in FIG. 2) by heat exchange with cathode off gas 16 to a temperature of typically approximately 650° C.

The remaining anode off gas 17, which is not recycled to the ejector 7, is transferred to the catalytic burner 5 where it is burnt together with cathode off gas 16. The catalytic burner 5 operates with an exit temperature of typically approximately 700° C. The waste heat in the flue gas 4 from the catalytic burner 5 supplies heat for evaporation of ethanol in heat exchanger E1 (identified by reference numeral 3 in FIG. 2). The remaining cathode off gas 18 not sent to the catalytic burner 5 is suitable as depleted air and can be used for heat exchange.

In an embodiment of the invention 50% of the anode off gas 9 is recycled to ejector 7 and 50% is transferred to the catalytic burner 5. The 50% anode off gas recycle serves to increase the overall electric efficiency and at the same time give a better flow distribution in the anode chamber(s) due to a higher mass flow. Additionally, the O/C ratio is also increased at the inlet to the methanation reactor R1.

Catalysts applicable in the methanation reactor are catalysts active in both decomposition and methanation of ethanol for instance a nickel, cobalt, copper or noble metal containing catalyst. A suitable noble metal containing catalyst is for instance a ruthenium containing catalyst or a rhodium containing catalyst.

In another embodiment of the invention a catalyst active in ethanol decomposition is installed in the methanation reactor upstream a catalyst active in methanation of the decomposed ethanol. An applicable upstream catalyst in the methanation reactor is a catalyst known in the art to decompose ethanol without forming ethylene. This could for instance be a catalyst capable of decomposing ethanol into methane, CO and $H_2$. This reaction is decribed by David A. Morgenstern and James P. Fornango (Energy Fuels, 19 (4), 1708-1716, 2005) over a catalyst comprising Ni and Cu and by Galvita et al. (Appl. Catal. A: General 220 (2001) 123) over a catalyst comprising Pd.

Figure 3:
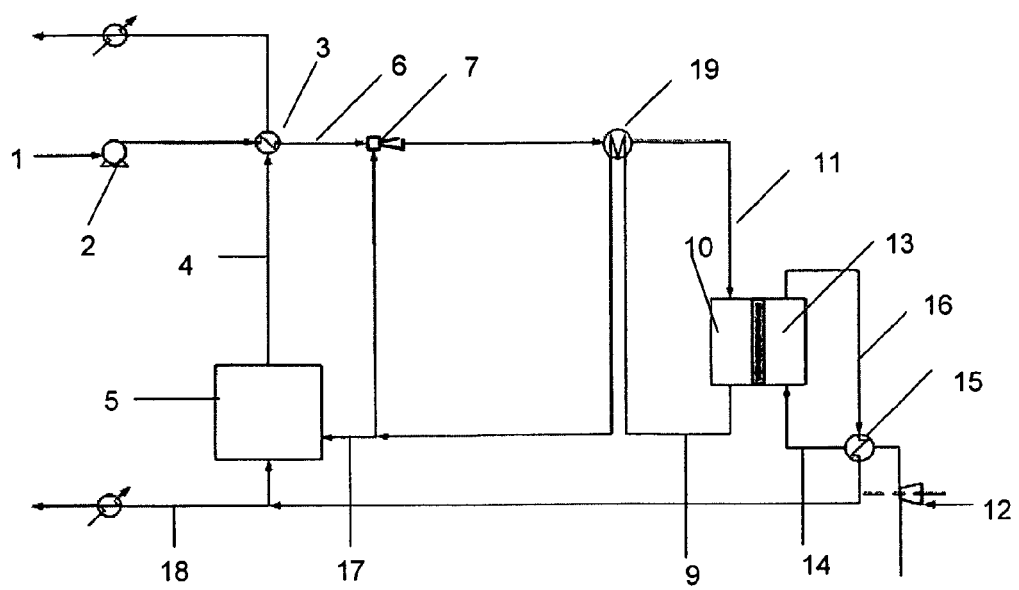
FIG. 3 is a schematic diagram of a comparative fuel processing system based on ethanol.

FIG. 3 is a schematic diagram of a comparative fuel processing system where the methanation reactor has been omitted from the process shown in FIG. 2 and the anode off gas recycle maintained. The reference numbers in this figure are identical to those of FIG. 2 unless otherwise stated.

In this processing system it is necessary to preheat the inlet gas 11 to the anode 10 in heat exchanger E2 (identified by reference numeral 19 in FIG. 3) as the temperature of the inlet gas 11 to the anode 10 would otherwise become too low. Heat exchanger E2 (identified by reference numeral 19 in FIG. 3) is prone to carbon lay down when the fuel processing system is operated with an anode off gas recycle percent of only 50% corresponding to an O/C ratio similar to that of the fuel processing system of the invention shown in FIG. 2.

A comparison of efficiency and duty for heat exchangers E1, E2 and E3 and the work for the air compressor in the fuel processing systems of FIGS. 1-2 have been made. The main results are summarised in Table 1.

TABLE 1

|  | Conventional System (FIG. 1) | System of Invention (FIG. 2) |
| --- | --- | --- |
| Electric efficiency (%) | 55.5 | 56.0 |
| Total Efficiency (%) | 83.6 | 83.0 |
| Feed flow (Nm³/h-kg/h) | 40.8 | 32.6 |
| E1 (kW) | 9.8 | 31.6 |
| E2 (kW) | 23.4 | — |
| E3 (kW) | 557.0 | 538.5 |
| Air compressor (kW) | 29.6 | 23.2 |

There are several advantages of converting ethanol to methane before further processing in the fuel cell stack. The potential for the problems associated with carbon formation are reduced. The heat exchanger (E2) for heating up the gas to the temperature required at the inlet to the anode is not necessary. The electric efficiency is increased and the combined heat exchanger duties and air compressor work are reduced.

An investment in an ethanol methanation reactor of the same size as the prereformer in the conventional system shown in FIG. 1 is required. However, an effective catalyst could lead to a reduction of the volume of the reactor required also because the ethanol is free of sulphur, which is a strong poison for catalysts.

The invention claimed is:

1. A method for generating electricity using a solid oxide fuel cell stack in combination with a methanation reactor, comprising the steps of:
   (a) supplying a feed stream comprising ethanol to a methanation reactor containing catalytic material active in the decomposition and methanation of ethanol, wherein the methanation of ethanol takes place according to the formulas:

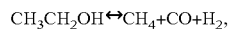

$CH_3CH_2OH \leftrightarrow CH_4+CO+H_2,$

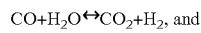

$CO+H_2O \leftrightarrow CO_2+H_2,$ and

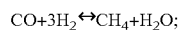

$CO+3H_2 \leftrightarrow CH_4+H_2O;$ (b) converting the feed stream comprising ethanol in the methanation reactor under adiabatic conditions to produce an effluent fuel comprising methane, carbon monoxide, carbon dioxide, hydrogen and water and to produce a temperature increase across the methanation reactor;
   (c) transferring the effluent fuel comprising methane, carbon monoxide, carbon dioxide, hydrogen and water to the anode of a solid oxide fuel cell stack comprising at least one solid oxide fuel cell;
   (d) providing the cathode of the solid oxide fuel cell stack with an oxygen-containing gas; and
   (e) converting the fuel comprising methane, carbon monoxide, carbon dioxide, hydrogen and water and the oxygen-containing gas to electricity in the solid oxide fuel cell stack.

2. Method according to claim 1, wherein the feed stream comprising ethanol is vaporised before being supplied to the methanation reactor.

3. Method according to claim 1, wherein the off gas produced at the anode of the solid oxide fuel cell stack is partially recycled to an ejector placed upstream the methanation reactor.

4. Method according to claim 3, wherein 50% of the anode off gas is recycled to the ejector.

5. Method according to claim 1, wherein the catalytic material comprises a catalyst active in ethanol decomposition without forming ethylene.

6. Method according to claim 1, wherein the catalytic material is a nickel, cobalt, copper or ruthenium or other noble metal containing catalyst.

7. Fuel processing system for use in the fuel processing method of claim 1 comprising a methanation reactor comprising catalytic material for methanation of ethanol and a solid oxide fuel cell stack comprising at least one solid oxide fuel cell, the solid oxide fuel cell stack being placed down stream and in series with the methanation reactor.

8. System according to claim 7 comprising an ejector upstream and in series with the methanation reactor.

9. System according to claim 8 comprising recycling means for transferring off gas produced at the anode of the solid oxide fuel cell stack to the ejector.

* * * * *